INVENTOR.
BRUCE McADAMS
BY Alfred C. Hill
AGENT

INVENTOR.
BRUCE McADAMS
BY Alfred C. Hill
AGENT

MULTIPLEX COMMUNICATION SYSTEM

Filed Dec. 4, 1959 8 Sheets-Sheet 3

INVENTOR.
BRUCE McADAMS
BY Alfred C. Hill
AGENT

INVENTOR.
BRUCE McADAMS
BY Alfred C. Hill
AGENT

INVENTOR.
BRUCE McADAMS
BY Alfred C. Hill
AGENT

INVENTOR.
BRUCE McADAMS
BY Alfred C. Hill
AGENT

INVENTOR.
BRUCE McADAMS
BY Alfred C. Hill
AGENT

INVENTOR.
BRUCE McADAMS
BY Alfred C. Hill
AGENT 3,040,128

MULTIPLEX COMMUNICATION SYSTEM

Bruce McAdams, Pompton Plains, N.J., assignor to International Telephone and Telegraph Corporation, Nutley, N.J., a corporation of Maryland Filed Dec. 4, 1959, Ser. No. 857,391
20 Claims. (Cl. 178—50)

This invention relates to multiplex communication systems and more particularly to an improved time division multiplex code communication system, such as a Teletype system, whose multiplex output is capable of modulating the pulse train of one channel of another time division multiplex communication system, such as a PAM (pulse amplitude modulation), a PWM (pulse width modulation), a PTM (pulse time modulation) or a PCM (pulse code modulation) system.

Information is transmitted in code systems, such as Teletype, by employing a sequenc of code characters each of which includes a plurality of code elements or bits, said characters each representing a letter or command signal which at the receiving end operate a teleprinter to transform the code characters into a printed message. In known time division multiplex code systems, such as Teletype, the plurality of code signals are transmitted over a single communication path by time interleaving complete characters of the plurality of Teletype channels. This is accomplished by storing a character (a plurality of code elements) in each of the Teletype channels and then reading out in sequence the stored character of each Teletype channel. An undesirable characteristic of this system is that if the storage device was not full, in other words the complete character was not stored, at readout time, a Teletype machine "blank" is generated which will lead to errors in the transcription of the received Teletype signals. The sequential transmission of complete characters for each of the Teletype channels renders it almost impossible to transmit such multiplex Teletype signals over a single channel of communication systems employing PAM, PWM, PCM or PTM techniques.

It is, therefore, an object of the present invention to provide an improved time division multiplex code signal system of the Teletype type overcoming the above-mentioned disadvantages of the presently-known Teletype time division multiplex signal systems.

Another object of this invention is to provide a time division multiplex Teletype system in which individual code elements of a plurality of code signals are sequentially time interleaved. This results in a reduction of the complexity of equipment since the storage equipment in a code signal channel need store only one code element at a time until said storage equipment is sampled rather than a plurality of code elements making up a code character.

Still another object of this invention is to provide a multiplex communication system of the PAM, PWM, PCM or PTM type in which at least one of the signal channel pulse trains is modulated by the resultant output of the improved time division multiplex Teletype system.

A feature of this invention is the utilization of a channel pulse train of a multiplex pulse communication system to generate timing signals to control the time interleaving of the code elements of a plurality of Teletype signals and to convey the resultant time multiplex Teletype signal to a remote point.

Another feature of this invention is a multiplex communication system having at the transmitting end thereof a generator for generating a first plurality of trains of pulses recurrent at a given repetition frequency and time spaced with respect to each other and means to modulate certain ones of said first trains of pulses in accordance with an associated signal wave. A second plurality of trains of pulses having repetition frequencies different than said given repetition frequency and time spaced with respect to each other are produced in response to others of said first trains of pulses. Means are furnished at modulate each of said second trains of pulses in accordance with an associated signal wave, such as a code signal. The resultant modulated second train of pulses modulates said others of said first trains of pulses for propagation of this second plurality of associated signal waves over at least one channel of the communication system to a receiving station. At the receiving station, a synchronizing signal provided at the transmitting station produces a first plurality of timing signals having a repetition frequency equal to said given repetition frequency time spaced with respect to each other. A means responsive to the received channel signals and certain ones of said first timing signals recover the intelligence signals of said certain ones of said trains of pulses and a means responsive to others of said first timing signals and said received signal separate said others of said trains of pulses from the received signal. A timing signal generator is responsive to said others of said first timing signals to produce a second plurality of timing signals having a repetition frequency different than said given repetition frequency time spaced with respect to each other and means are provided which are responsive to said second plurality of timing signals and said others of said trains of pulses to recover the intelligence signal of said others of said trains of pulses.

Another feature of this invention is the provision of a code signal multiplexer having a plurality of signal channels and an output means coupled in common to each of said signal channels. Each of the signal channels includes a device responsive to the code signals of each of said signal channels to sequentially store each of the code elements of said code signals at a predetermined repetition frequency and a means coupled to said storage means of each of said channels to sequentially couple correspondingly timed code elements of the code signals of each of said channels to said output means at a second repetition frequency to provide a resultant signal having said correspondingly timed code elements in a time adjacent relationship. Each of the signal channels of the code signal multiplexer further include an arrangement therein responsive to the code signals to prevent the coupling of a code element to the output means of the multiplexer at the instant a transition from one level to the other level of a two-level code signal occurs to reduce errors which otherwise would result.

The above-mentioned and other features and objects of this invention will become more apparent by reference to the following description taken in conjunction with the accompanying drawings, in which.

Figure 1:
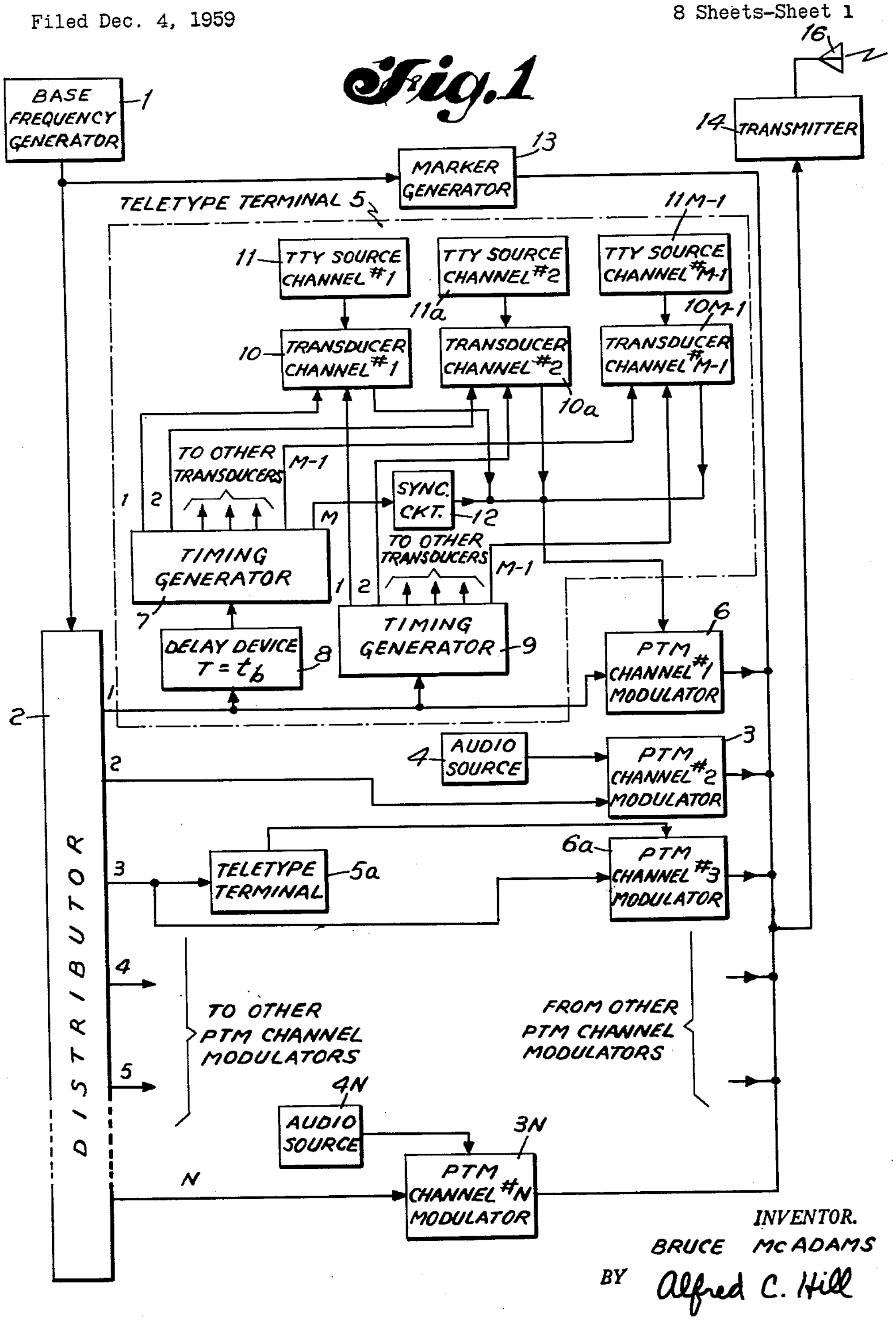
FIGURES 1 and 2 are schematic block diagrams of transmitting and receiving terminals, respectively, of a multiplex communication system in accordance with the principles of this invention.

Referring to FIG. 1, the transmitting station of the multiplex communication system of this invention is illustrated as including a means for generating a first plurality of trains of pulses having a given repetition frequency time spaced with respect to each other. This means comprises a frequency generator 1 and distributor 2. The pulse train output of generator 1 having a given repetitious frequency is coupled to distributor 2, which may take the form of a delay line having a plurality of spaced taps therealong to provide a plurality of time spaced pulse trains at said given repetitious frequency equal in number to the channels incorporated in the time division multiplex communication system. For purposes of illustration certain of the outputs of the delay line taps, such as the pulse train outputs for channel two, four, five to N are illustrated as being modulated by modulators 3 to 3N to vary the timing thereof in order to transmit the intelligence of sources 4 to 4N in accordance with PTM techniques. The configuration of modulator 3 may take any well-known configuration, such as that illustrated in U.S. Patent No. 2,485,591. It is to be understood that while we have illustrated that certain of the first plurality of trains of pulses present at the output of distributor 2 are modulated in accordance with PTM techniques, these pulse trains may be modulated in accordance with PAM, PWM or PCM techniques for the purposes of conveying the intelligence of sources 4 to a distant receiver.

The pulse train of channel one of the time division multiplex system is illustrated as being coupled to a Teletype terminal 5 wherein the pulse train of channel one is operated upon to produce a second plurality of trains of pulses having repetition frequencies different than the repetition frequency of the channel pulse trains. Each of these second trains of pulses are operated upon by an associated signal, such as a Teletype signal, for modulation of these second trains of pulses independently of each other. These modulated second trains of pulses are coupled to modulator 6 of channel one of the basic time division multiplex system. Modulator 6 acts to modulate the train of pulses of channel one in accordance with the modulated second trains of pulses for propagation over a propagation medium in a time interleaved relationship with the modulated pulses of modulators 3. Modulator 6, if employed as illustrated in connection with Teletype terminal 5, may be a modified form of a PTM modulator wherein the presence of a Teletype pulse causes the pulses of the train from distributor 2 to be moved from a normal state to a time displaced state while the absence of a Teletype pulse maintains the pulse coupled from distributor 2 in its normal state. Modulator 6 may take still another form wherein the presence of a Teletype pulse allows the pulse coupled from distributor 2 to pass the modulation output while the absence of a Teletype pulse blanks the pulse from distributor 2.

Referring now with greater particularity to Teletype terminal 5, the pulse train output of distributor 2 for channel one of the PTM multiplex system is coupled to two timing generators, timing generator 7 through a delay line 8 and directly to timing generator 9. M–1 output terminals of timing generator 7 are coupled to transducers 10 to sequentially activate transducers 10 to translate the inteligence signal emanating from intelligence sources 11 in the form of a Teletype signal to a signal which may be sampled a code element at a time in accordance with this invention. The output of the Mth terminal of timing generator 7 is coupled to a synchronizing circuit 12 to act upon the pulses of this pulse train in a manner to produce a distinguishable characteristic to enable the synchronization of the receiving Teletype terminal. Circuit 12 may act upon the pulse train emanating from the Mth tap of timing generator 7 to remove every other pulse therefrom by modulating this pulse train with a square wave at a rate one half the normal repetitious rate of the pulse train to thereby produce a pulse train having a repetitious frequency one half of the repetitious frequency of the other pulse trains. This will then enable the recognition of this pulse train for purposes of generating a synchronizing signal at the receiving terminal. The output of synchronizing circuit 12 and the transducers 10 are coupled to a common output circuit which due to their time relationship, as established by timing generator 7, produces a multiplex Teletype signal, said multiplex Teletype signal having the novel characteristic of correspondingly timed code elements of the plurality of Teletype signals being in time adjacent relationship rather than the complete character of the Teletype signal being in time adjacent relationship. Timing generator 9 has a plurality of output taps equal in number to the output taps of timing generator 7, one coupled to each of the transducers 10 to cooperate therein in reducing the possibility of an error occurring in the sampling of the Teletype signal for application to modulator 6, said reduction of error being described hereinbelow with reference to the operation of FIG. 6. The delay device 8 which may take the form of a time delay line has sufficient time delay to time space the channel pulse trains produced in timing generator 7 and 9 to enable the realization of the error protection features of the transducers 10.

The general operation of the Teletype terminal 5 in connection with its relationship to the pulse train output of channel one from distributor 2 has been hereinabove described. It is to be noted that the multiplex communication system of this invention is not limited to modulating one main channel of communication, such as channel one of the PTM multiplex system, but any number of these PTM channels, or basic pulse system channels, may be utilized for the transmission of multiplex Teletype signals to a distant receiver as is illustrated by the Teletype terminal 5a associated with the channel three output of distributor 2. The components included in Teletype terminal 5a will be substantially identical with those shown in greater detail in terminal 5. The output of Teletype terminal 5a is utilized to modulate the channel three output of distributor 2 in modulator 6a in the manner described in connection with modulator 6.

Figure 2:
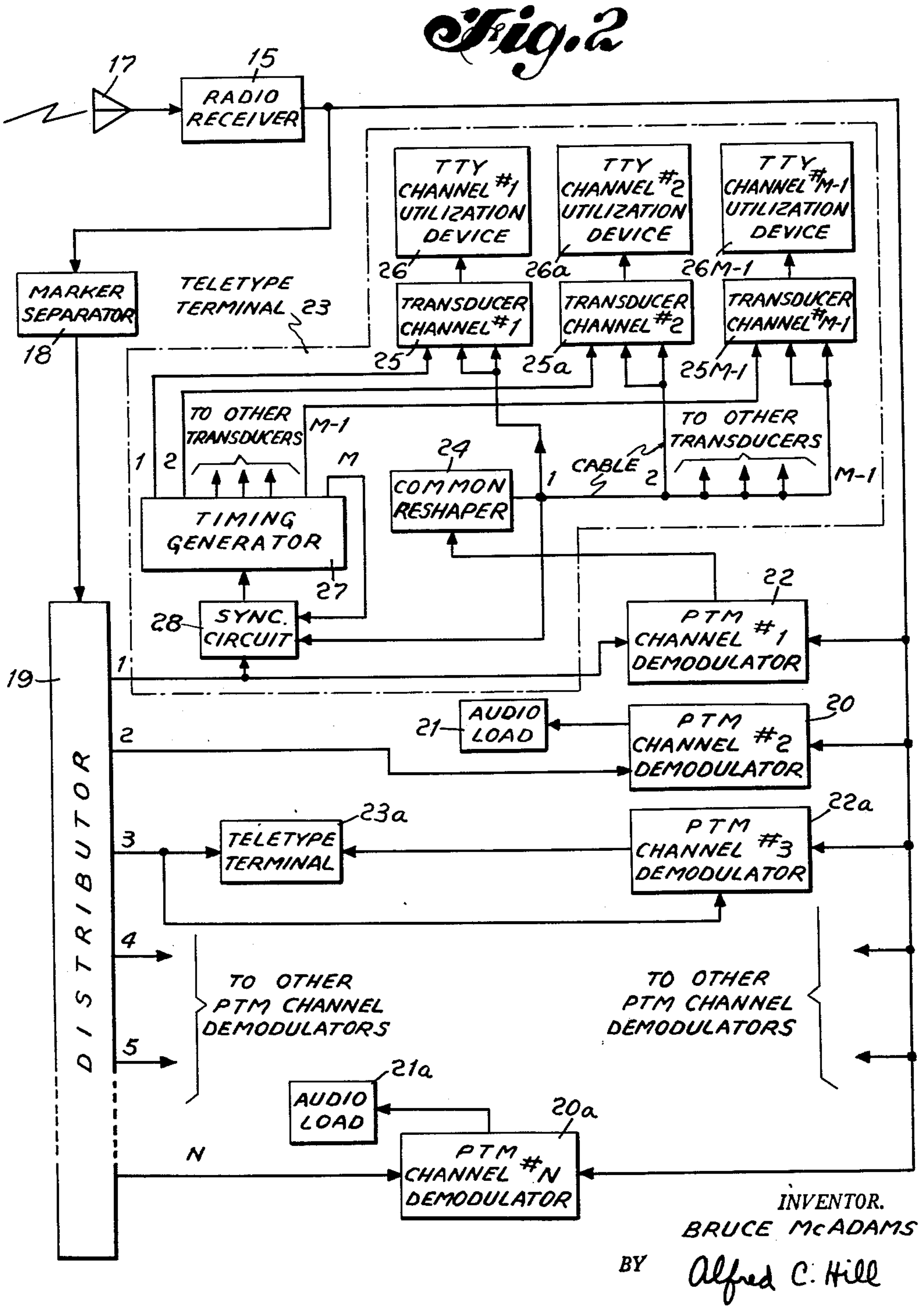
Figure 3:
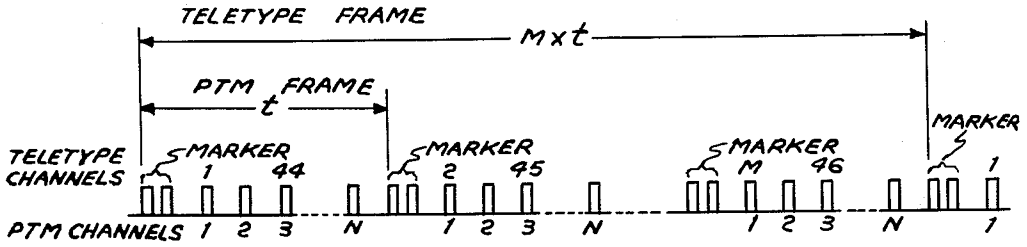
FIG. 3 is a curve illustrating the multiplex pulse train produced for transmission between the stations represented in FIGS. 1 and 2.

The output of basic frequency generator 1 is coupled to a marker generator 13 to produce an output having distinguishable characteristics and is a well-known technique to synchronize the basic frequency generator at the receiving station of the multiplex communication system with the output of the generator 1 of the transmitting station. The ouputs from marker generator 13 and channel modulators 3 and 6 are coupled to transmitter 14 in the form of a time spaced multiplex pulse train substantially as illustrated in FIG. 3 for propagation to a distant receiver 15 as illustrated in FIG. 2. As illustrated in FIGS. 1 and 2 the propagation is accomplished through antennas 16 and 17 which constitutes the terminal ends of a radio propagation link. It is to be understood that the utilization of the system of FIGS. 1 and 2 is not necessarily limited to radio communication but may utilize other forms of propagation, such as by a waveguiding structure.

Referring to FIG. 3, the multiplex pulse train coupled to transmitter 14 is illustrated in detail to illustrate the time relationship between the basic pulse communication frame rate and the Teletype frame rate. It is illustrated that the basic pulse communication frame rate, the PTM frame rate in our illustration, has a value $t$ between the leading edges of the double marker or synchronizing pulses of generator 13. In this time $t$ there is included N PTM channels as indicated by the numbers below the pulses. The channels two, four to N may be modulated in accordance with an intelligence signal in the usual manner as pointed out hereinabove. As illustrated, channels one and three are each modulated by a plurality of second intelligence signals, such as Teletype signals. Due to the cooperation of the circuitry in the Teletype terminal 5, each code element of a Teletype code character is sampled in sequence in such a manner that correspondingly timed code elements of each Teletype channel are coupled in sequence to the PTM channel. This is illustrated in FIG. 3 with reference to PTM channel one wherein the first code element of Teletype channel one is coupled to PTM channel one and the first code element of Teletype channel two in the next PTM frame is coupled to PTM channel one and so forth until the first code element of the Mth Teletype channel is coupled to PTM channel one thereby providing a Teletype frame $M \times t$ as is illustrated in FIG. 3. This same sampling process will be continued for code element number two then code element number three and so forth until each code element of each character of each channel has been sequentially sampled. Then the sampling will move on to the next character of each channel. This same sequence is illustrated with respect to PTM channel 3 where the correspondingly timed code elements of each Teletype channel are coupled in sequence to PTM channel three. It should be noted that the Teletype channels associated with PTM channel 1 do not have to be synchronized with those of channel 3. As illustrated in FIG. 3 the Teletype channels associated with different PTM channels can be in a random relation with respect to each other. The production of the Teletype output for coupling to the PTM channels will be described in greater detail hereinbelow and will clarify the timing relationship between the Teletype frame rate, the code character rate, and the PTM frame rate.

As pointed out hereinabove, the multiplex pulse train as illustrated in FIG. 3 is propagated to radio receiver 15 of FIG. 2 at the receiving station. The multiplex pulse train of FIG. 3 is coupled to marker separator 18 to separate from the transmitted multiplex pulse train the double marker pulse and produce from this double marker pulse of the basic time division train of pulses recurring at the same frequency as the pulses produced in basic frequency generator 1. This pulse train is coupled to distributor 19 having disposed therealong a plurality of output taps for coupling the channel pulse trains of the basic time division multiplex system to the appropriate channel demodulators thereof for the purpose of separating their respective channel pulse trains from the received multiplex pulse train for production of a signal which may be utilized for recovery of the intelligence carried on the individual channel pulse trains. As illustrated in FIG. 2, the pulse train outputs of channels two and four to N are coupled to well-known PTM demodulators 20 to enable the separation of their respective channel pulse trains from the received multiplex signal and to recover the intelligence carried thereby for application to their respective audio loads 21. The action of the modified PTM demodulators 22 present in PTM channels 1 and 3 is to separate from the receiver multiplex pulse train under the action of the appropriate output of distributor 19 the pulse trains of PTM channels one and three for application to the Teletype terminals 23 and 23*a* respectively. The channel gate pulse train outputs of distributor 19 of PTM channels one and three are likewise coupled to Teletype terminals 23 and 23*a* to cooperate in segregating each Teletype channel of the Teletype multiplex signal and route these segregated Teletype signals to their appropriate Teletype utilization device.

This is accomplished generally as illustrated in FIG. 2 by coupling the output of the demodulators 22 to a common reshaper 24 to reshape and lengthen the pulses representative of the Teletype signal. The lengthening of these pulses reduce the timing accuracy requirements of the pulses of the timing generator. The output of reshaper 24 is then applied to the Teletype channel transducers 25 wherein the pulses representative of the Teletype signal of the appropriate Teletype channel are utilized to regenerate the Teletype signal for application to their respective Teletype utilization devices 26. The separation of the Teletype channel signals from the Teletype multiplex pulse train, and the regeneration of the Teletype signal is timed by the appropriate output from timing generator 27 which is triggered by the channel pulse train output from distributor 19, this triggering constituting what might be considered a coarse timing adjustment for the Teletype terminal 23. Timing generator 27 is similar in structure to timing generators 7 and 9 at the transmitting end to be described hereinbelow with respect to FIG. 4. The Mth pulse train output of timing generator 27 is coupled to the synchronizing circuit 28 and the output of reshaper 24 is coupled to sync circuit 28 so that the Mth pulse train in the Teletype multiplex pulse train will be separated in the sync circuit and will operate to provide a fine timing adjustment for the timing generator 27. The details of sync circuit 28 will be discussed hereinbelow with respect to FIG. 8.

To facilitate the explanation of the multiplex communication system in greater detail, an example will be employed setting forth the number of Teletype channels to be propagated on a single PTM channel and the basic rate at which the PTM system and hence Teletype system operates. It is to be understood, however, that this example by no way is intended to limit the scope of the possible applications of this system or the frequencies, time and number of channels involved. Let us assume that the period of a PTM frame, *t*, as illustrated in FIG. 3, is 125 microseconds, which will require an 8 kc. (kilocycles) signal from basic frequency generator 1. Let us further assume that M is equal to 100, that is, 100 Teletype channels will be transmitted over a single PTM channel. Therefore, in accordance with this invention wherein correspondingly timed elements of each Teletype channel are sampled in sequence, the period of a Teletype frame will be $M \times t$ or $100 \times 125 \times 10^{-6}$ seconds or in other words, 12.5 milliseconds. Thus, in accordance with the principles of this invention to transmit a seven element Teletype character, it will take $Y \times t \times M$ or $7 \times 100 \times 125 \times 10^{-6}$ or 87.5 milliseconds, where Y is equal to the number of code elements in a single Teletype code character.

It should be pointed out that the system of this invention may handle in an intermixed relationship the following start-stop Teletype speeds and baud rates: 60/7.4, TT160, 66/7.4, 75/7.4 and 100/7.4. To transmit these speeds and baud rates simultaneously it is merely necessary to adjust the individual Teletype transducers for the particular speed but as far as the transmission system is concerned, in other words, the PTM channel, the rate and baud length does not necessitate a change therein. The PTM sampling rate of 8 kc. will satisfactorily operate with the highest Teletype speeds specified above which provides the shortest baud length of approximately 13.5 milliseconds.

Figure 4:
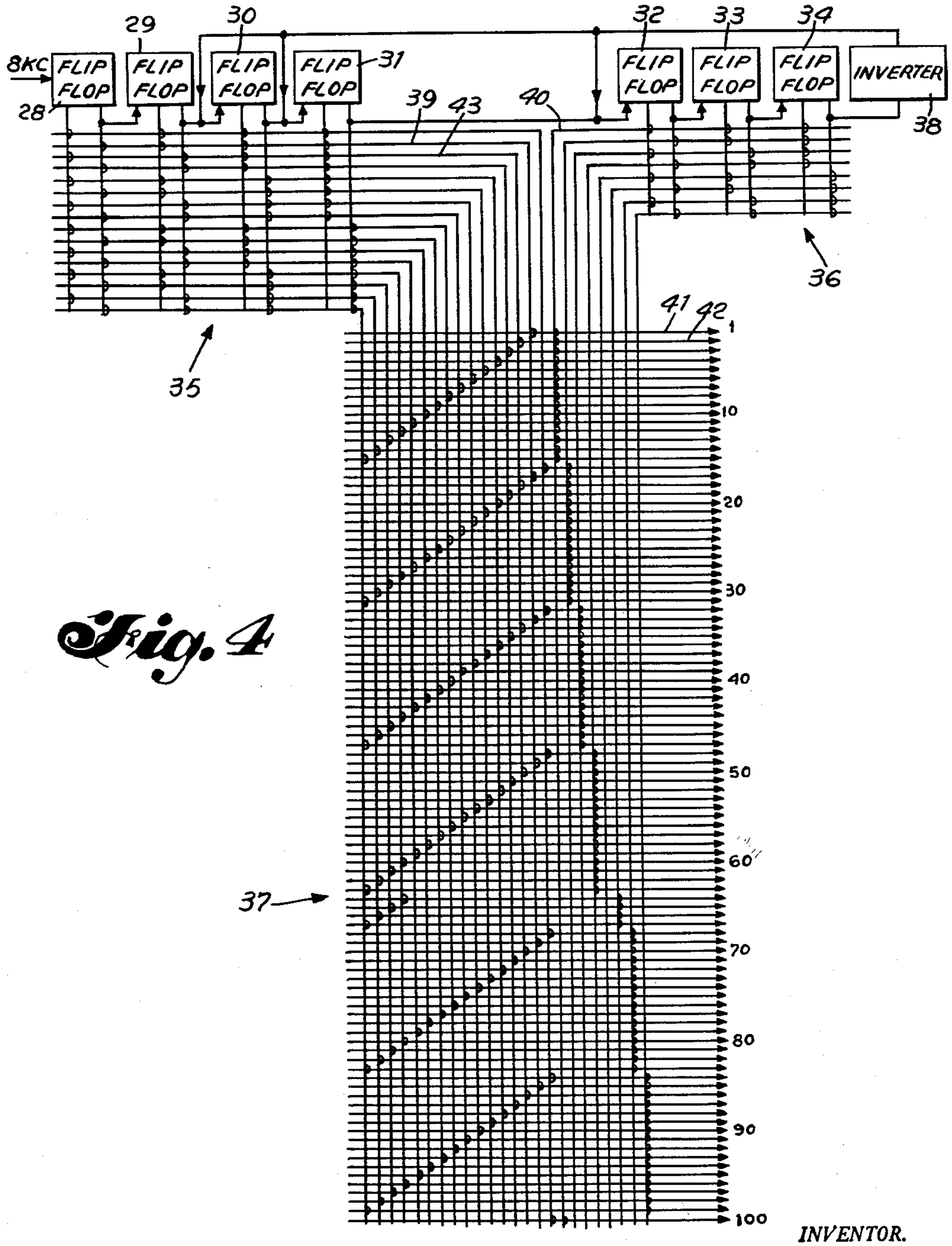
FIG. 4 is a symbolic representation of timing generators preferably employed in the Teletype terminal of FIGS. 1 and 2.

Referring to FIG. 4, there is illustrated therein a preferred arrangement of timing generators 7, 9 and 27 of FIGS. 1 and 2 to provide the 100 pulse trains having a repetition rate of 80 cycles per second time spaced with respect to each other 125 microseconds. Basically the timing generators include a 128-count binary counter including seven binary circuits illustrated as flip-flops 28, 29, 30, 31, 32, 33 and 34. The outputs of flip-flops 28 to 31 are applied to a primary diode matrix 35 arranged as illustrated to provide an output upon the occurrence of any one of a possible sixteen different conditions at the outputs of flip flops 28 to 31. The semi-circles connecting the vertical and horizontal lines are symbolic of the input diode of an "AND" circuit. The outputs of flip flops 32 to 34 are coupled to a primary diode matrix 36 as illustrated which will provide an output for any one of a possible eight different conditions of output from the flip flops 32 to 34. The outputs from the primary matrices 35 and 36 are appropriately combined in a secondary matrix 37 wherein it would be possible to provide 128 outputs representing 128 different conditions of the outputs of the primary matrices 35 and 36. However, in accordance with the requirements of the present multiplex communication system, the secondary matrix has been modified to provide only 100 outputs as is desired for the 100 Teletype channels and a reset arrangement is provided in connection with flip flop 34 including inverter 38 wherein the transition of flip flop 34 from a zero state to a one state at the occurrence of the 64th pulse of the 8 kc. signal produces a trigger pulse which is coupled to the input of flip flops 30, 31 and 32 to advance the count of the binary counter so that upon the occurrence of the 100th pulse of the signal the binary counter will be reset to its initial condition.

Figure 5:
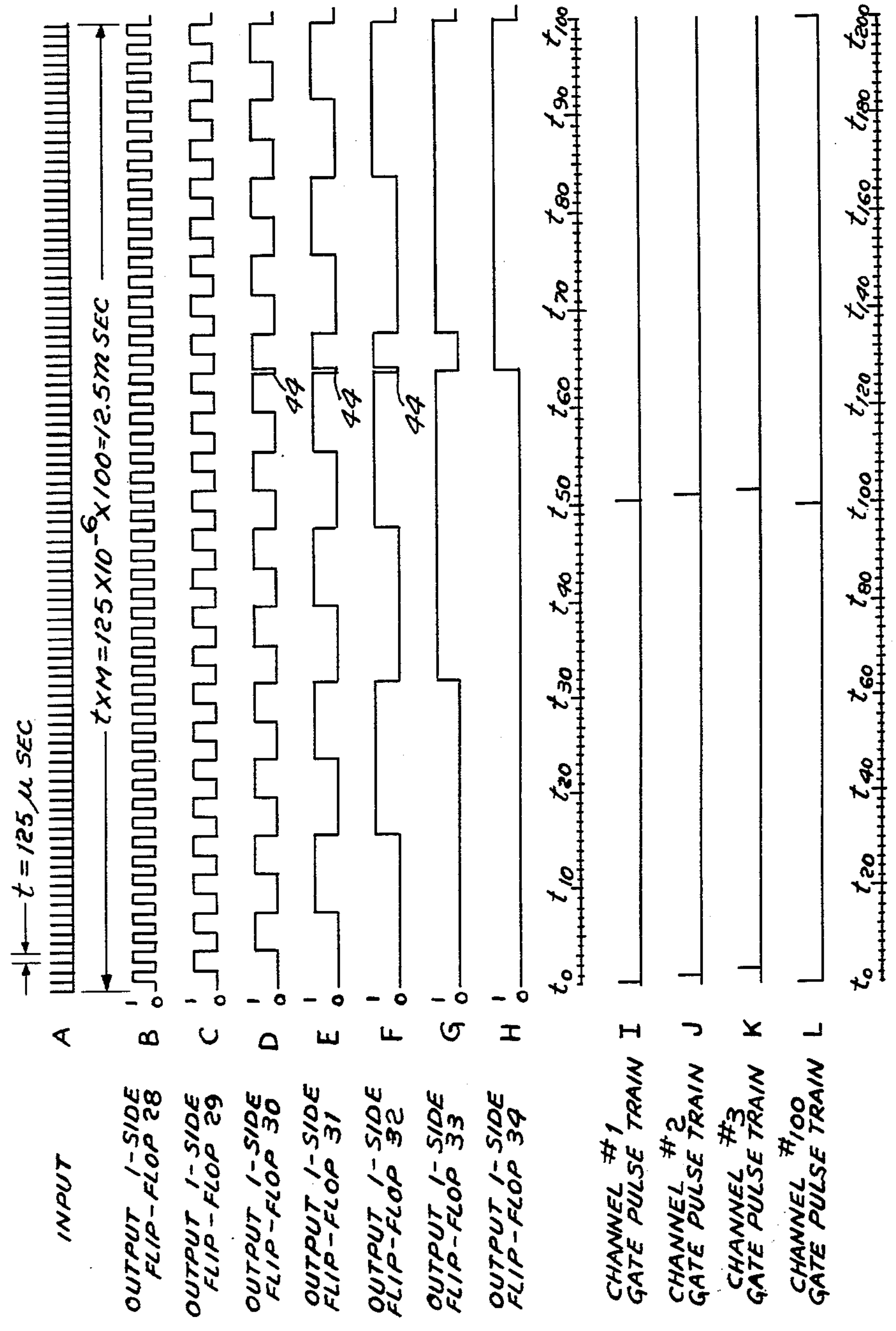
FIG. 5 illustrates a series of curves useful in explaining the operation of the timing generator of FIG. 4.

The operation of the timing generator of FIG. 4 can be followed by reference to the curves of FIG. 5 wherein curve A represents the input pulse train to flip flop 28 which is the basic pulse train of the PTM multiplex system with a spacing of 125 microseconds between pulses which will produce after a count of 100 a frame time of 12.5 milliseconds and a frequency rate of 80 cycles per second. Curves B to H of FIG. 5 illustrate the outputs of flip flops 28 to 34, respectively, at their one output, it being remembered that at their zero output the signal is 180 degrees out-of-phase with the illustrated curves. Let us follow through the production of one of the Teletype channel pulse trains to demonstrate the operation of this timing generator. At time $t_0$ the flip flops are all at the zero level as illustrated. At time $t_1$ a pulse of the curve A input arrives at flip flop 28 causing the flip flop to assume the stable state of one and each of the other flip flops to remain in the stable state of zero. Thus, we have the binary count of 1000000. Under this condition of the flip flops an output pulse will appear on line 39 at the output of the primary matrix 35 which represents a count of 1000. Line 40 at the output of matrix 36 represents the count 000. Thus, to obtain an output from line 41 of the secondary matrix 37 it would be necessary to couple to lines 39 and 40 an "AND" circuit with line 41 representing the output of the "AND" circuit and lines 39 and 40 representing the input of the circuit as symbolically represented by the semi-circles connecting lines 39, 40 and 41. The presence of a pulse on lines 39 and 40 at the output of primary matrices 35 and 36, respectively, will not appear again to produce an output from the "AND" circuit on line 41 until after the counter has counted 100 of the input pulses of curve A thereby reducing the 8 kc. repetition rate of the input pulse to an 80 cycle per second repetition rate through the counting operation. The next output on line 42 of secondary matrix 37 is produced at time $t_2$ when the second pulse of the input signal of curve A has caused flip flop 28 to return to its zero state and flip flop 29 to assume its one state. Hence, we now have a binary count of 0100000. Line 43 at the output of matrix 35 will have a pulse thereon representative of a binary count 0100 which in combination with the output on line 40 of matrix 36 representing the binary count 000 will produce the pulse train for the second Teletype channel also recurrent at a repetition rate of 80 cycles per second time spaced from the output of line 41, Teletype channel one pulse train, by 125 microseconds.

While the timing generators 7, 9 and 27 have been described as incorporating the circuitry of FIG. 4, it should be remembered as pointed out hereinabove it would be possible to employ a delay line to provide the channel gate pulse trains in much the same manner as the base frequency generator 1 and distributor 2 of the PTM multiplex arrangement.

Figure 6:
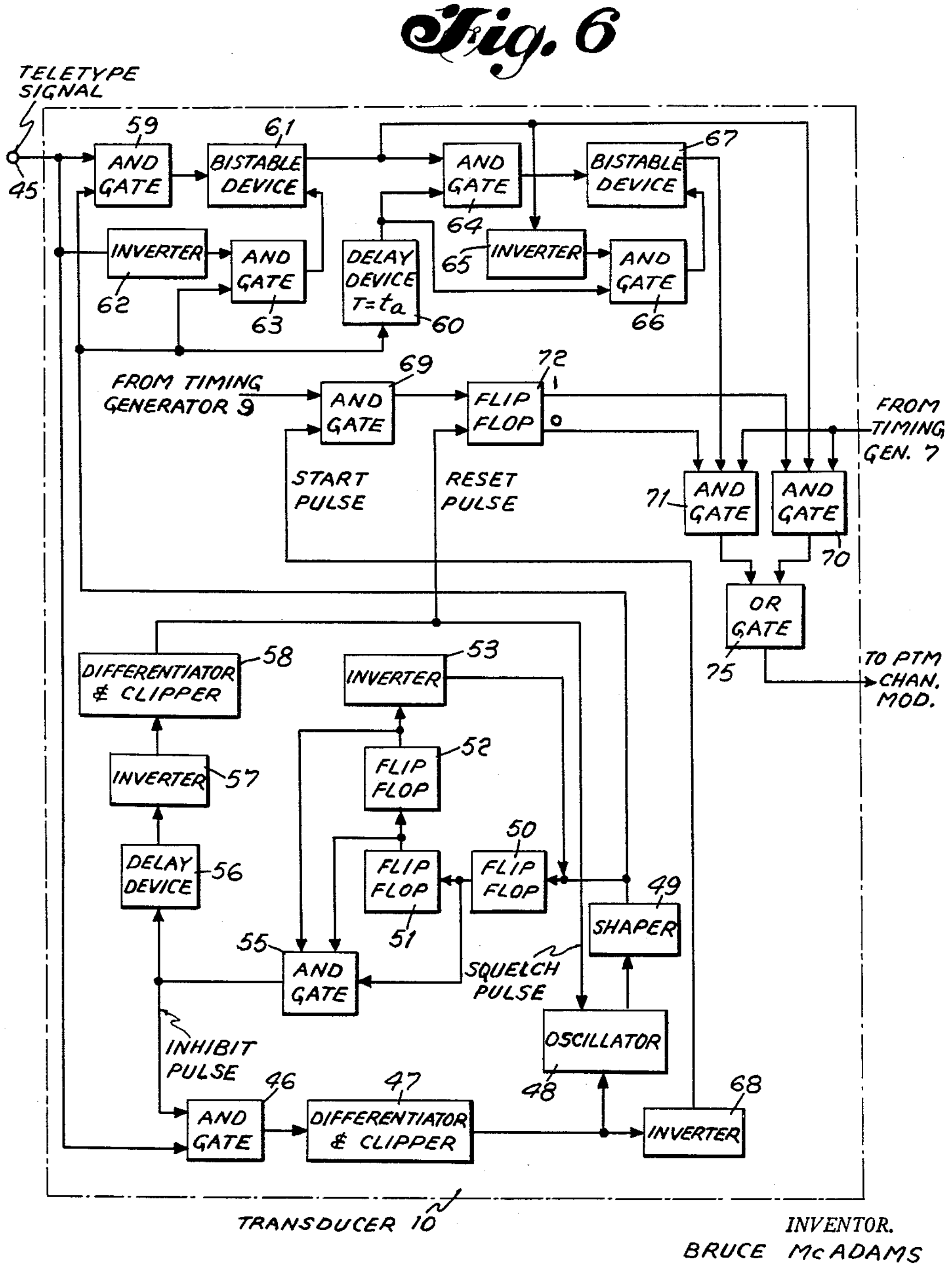
FIG. 6 is a schematic diagram in block form of the transducer employed in the Teletype terminal of FIG. 1.
Figure 7:
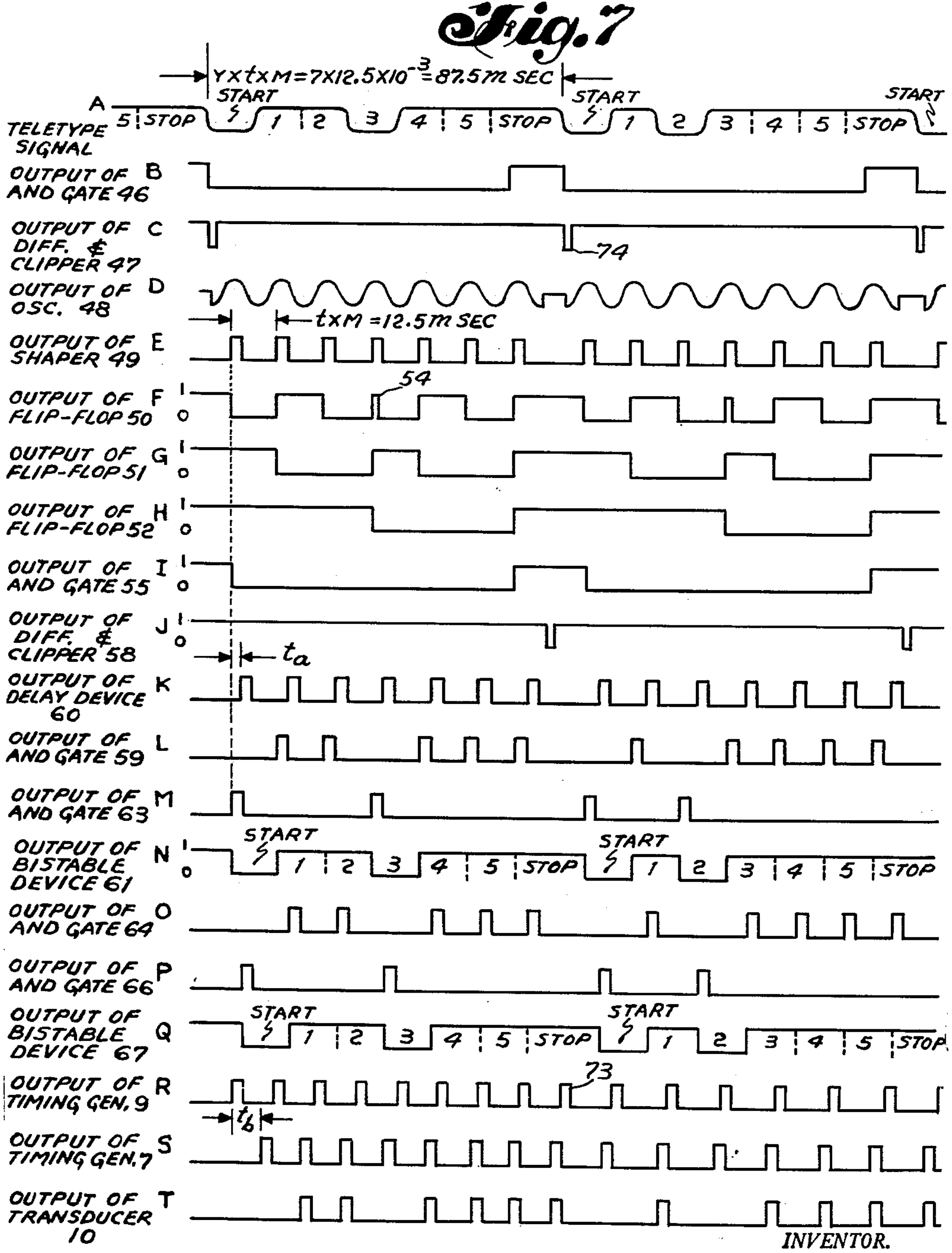
FIG. 7 is a series of curves useful in explaining the operation of the circuit of FIG. 6.

Referring now to FIGS. 6 and 7, the operation and structure of transducers 10 of the transmitting station as illustrated in FIG. 1 will be described in greater detail. The Teletype input from Teletype source 11 is coupled to terminal 45 and is illustrated in curve A of FIG. 7. It will be observed from the illustration in curve A, FIG. 1, that the Teletype signal is a seven-code element per character start-stop Teletype signal being distorted in its travel from the source to the transducer.

The signal at terminal 45 is coupled to "AND" gate 46. The inhibit pulse input of "AND" gate 46, the production of which will be described shortly, has placed a high level on its input to "AND" gate 46 and hence the high level of the stop signal of the Teletype signal of curve A produces a high output to differentiator-clipper 47. Upon occurrence of the transition between the stop pulse and the start pulse, a lower level step is produced at the output of "AND" gate 46 as illustrated in curve B, FIG. 7. This lower level step is coupled to differentiator-clipper 47 to produce a negative going spike as illustrated in curve C, FIG. 7, time coincident with the lower level step at the output of gate 46. The clipper portion of differentiator clipper 47 passes only a negative going differentiated spike and will block any positive going spike which would be produced when the "AND" gate returns to the high level output condition as occurs upon the coincidence of the next stop pulse of the Teletype signal and the high level of the inhibitor pulse applied to gate 46.

Thus, the equipment has detected the transition between the stop and start pulse which is the reference time for the regeneration of the Teletype signal as well as the reference time for any other operation upon the Teletype signal. The output of differentiator-clipper 47 is coupled to oscillator 48. This trigger pulse starts oscillator 48 oscillating at a frequency equal to the baud rate of the incoming Teletype signal. The oscillator 48 may be a ringing oscillator which includes a ringing circuit responsive to the trigger pulse to produce the desired oscillations. Thus, since oscillator 48 produces an oscillatory signal whose frequency is equal to the baud rate of the incoming Teletype signal, the oscillator of the transducer of each Teletype channel must be adjusted to the baud rate of the Teletype signal coupled to the transducer of that particular Teletype channel. The resultant oscillatory output of oscillator 48 is illustrated in curve D, FIG. 7. This sinewave signal output of oscillator 48 is coupled to shaper 49 to produce the pulses illustrated in curve E which are utilized in other components of the transducer to sample the incoming Teletype signal for regeneration thereof. It will be observed that the output of oscillator 48 has seven oscillations, each of the oscillations corresponding in time positions to one of the seven-code elements of a Teletype character. Thus, the output of shaper 49 results in seven sampling pulses spaced one from another by a time equal to the Teletype bit frame rate, or namely, 13.42 milliseconds for 100 word per minute Teletype. The output of shaper 49 is coupled to a binary counter including flip flops 50, 51 and 52. The three flip flops connected in cascade normally are a scale of eight counter but since it is desired to count only seven pulses in this instance the binary counter is advanced in its count by the cooperation of inverter 53 to enable the binary counter to be reset to its initial condition upon the occurrence of the seventh pulse. The waveforms in curves F, G and H of FIG. 7 illustrate the counting process which takes place in the binary counter as well as the advance in counting as represented by the spike 54 of curve F, FIG. 7. By appropriately connecting the outputs of flip flops 50, 51 and 52 to an "AND" gate 55 it is possible to produce a pulse which will enable "AND" gate 46 to detect the transition from the stop to the start pulse and likewise to inhibit "AND" gate 46 to prevent any other transition in the Teletype character to trigger "AND" gate 46. The resultant output of "AND" gate 55 is illustrated in curve I and is the inhibit pulse hereinabove mentioned with respect to "AND" gate 46. It will be observed that the inhibit pulse is at its one condition during the occurrence of the transition from stop to start and that it is reutrned to its zero condition upon the occurrence of the first pulse at the output of shaper 49. It should be further noted that it is returned to its one condition upon the occurrence of the seventh pulse at the output of shaper 49 to thereby place gate 46 in condition to detect the stop-start transition.

The output of gate 55 is coupled to a delay device 56 to delay the zero to one transition of the inhibit pulse an amount sufficient to cause this transition to occur after the seventh pulse but yet prior to the stop-start transition of the Teletype signal. The output of delay device 56 is inverted by inverter 57 and then differentiated and clipped by differentiator-clipper 58 to produce a pulse as illustrated in curve J, FIG. 7. This negative pulse is employed in oscillator 48 to squelch the oscillator and hence stop the oscillation therein after the occurrence of the seventh pulse at the output of shaper 49 but yet prior to the stop-start transition to thereby ready oscillator 48 for the next cycle of operation.

In the description of the circuit of FIG. 6 hereinabove with respect to curves B to J, certain pulse signals have been produced which are employed in the remainder of the transducer circuit directly or by acting thereon in the appropriate manner to carry forth the desired operation hereinbelow described.

The output of shaper 49, curve E, FIG. 7, is coupled to "AND" gate 59 and to delay device 60 to produce a sampling pulse train delayed from the sampling pulse train of curve E, FIG. 7 as illustrated in curve K, FIG. 7, said two pulse trains being delayed by an amount $t_a$.

"AND" gate 59 has coupled thereto the Teletype signal of curve A, FIG. 7 and the sampling pulse train of curve E, FIG. 7. The output of "AND" gate 59 is illustrated in curve L, FIG. 7. It will be observed that due to the action of the "AND" gate wherein if one or both of the input signals are low, the output is low and if both of the input signals are high the output is high, the signal as illustrated in curve L, FIG. 7 has no pulse at the time that the start pulses of the Teletype are sampled or at the time that any of the other code elements are sampled that are at their low value as illustrated by code element three in the first code character and code element two in the second code character of curve A, FIG. 7. If the pulse train represented by curve L, FIG. 7 were coupled to bistable device 61 in a nonsymmetrical triggering arrangement, there would be no way of causing the bistable device 61 to regenerate those code elements that are at the low or zero level, such as the start pulse. This is overcome by inverting the input Teletype signal in inverter 62 and "AND" gating this signal with the output pulse train of shaper 49 in "AND" gate 63 which will produce a pulse train as illustrated in curve M, FIG. 7 having a pulse present for each of the Teletype code elements which are in the low condition, such as the start pulse.

With bistable device 61, such as a flip flop, in an initial condition where the output device is nonconducting the application of the output of "AND" gate 63 to the output device will trigger device 61 to turn the output device off and the input device on. The application of the output of gate 59 to the input device of device 61 will cause the input device to conduct and the output device to stop conducting thereby causing the transition from the zero to the one state. The application of the second pulse of the output of "AND" gate 59 to the input device of bistable device will have no affect upon the conduction condition of the bistable device 61 since due to the nonsymmetrical triggering thereof once the bistable device has been triggered into the one condition of conduction an application of a second pulse to this same trigger point will not alter the conduction condition. This process of triggering bistable device 61 by the output of "AND" gate 59 and "AND" gate 63 as represented by curves L and M, FIG. 7 will regenerate the input Teletype signal as illustrated in curve N, FIG. 7.

The output of bistable device 61 is coupled to "AND" gate 64 wherein under the influence of the delayed sample pulses at the output of delay device 60 the output of the device 61 is sampled to produce curve O, FIG. 7. Through the cooperation of inverter 65 and "AND" gate 66 a pulse train as illustrated in curve P, FIG. 7 is produced having pulses representative of those code elements which are at the zero level in curve N, FIG. 7. The output of "AND" gates 64 and 66 operate on bistable device 67 in much the same manner as described hereinabove with respect to 61 to produce a second regenerated Teletype signal as represented by curve Q, FIG. 7.

The bistable devices 61 and 67 in effect operate as a storage device for one code element at time with the code elements having a length of 13.5 milliseconds for the highest speed. This code element length and the sampling of devices 61 and 67 that takes place by the output of timing generator 7 effectively provide an arrangement to store one code element at a time with the read out of correspondingly timed elements of the code characters of the plurality of teletype channels being done sequentially to place these correspondingly timed code elements of each channel in time adjacent relationship. We have, therefore, a system which employs one code element storage rather than a system requiring storage of the complete Teletype character prior to readout.

The requirements in this system are such that each code element should be sampled at least once. This is provided by making the time between samples of each channel less than the shortest Teletype code element to be transmitted. In the example employed herein this is satisfied by utilizing sampling pulses being time spaced by 12.5 milliseconds while the shortest Teletype code element being transmitted has a duration of 13.5 milliseconds, corresponding to the highest Teletype speed mentioned hereinabove as examples of the Teletype speed this system can handle. A second requirement of this system is to read out of the storage device or bistable devices 61 and 67 at a time when there is no transition taking place in the Teletype signal. If a sample is taken during the transition period of the Teletype signal an incorrect signal may result. This second requirement is met by utilizing the output of timing generator 9 as illustrated in curve R, FIG. 7 to gate against the start pulse generated at the output of differentiator-clipper 47 after being inverted in inverter 68 and in "AND" gate 69.

Delving a little deeper into the arrangement to meet the second requirement the output of device 61 is coupled to "AND" gate 70 and the output of device 67 is coupled to "AND" gate 71. The appropriate pulse train output of timing generator 7 is likewise coupled to "AND" gates 70 and 71 and constitutes the read-out pulses for device 61 or device 67 or in other words, transducers 10. It will be noted by comparing curves R and S, FIG. 7 that the output of timing generator 7 is delayed in time with respect to the output of timing generator 9, said time delay being provided by delay line 8 of FIG. 1. This time delay is sufficient to enable the detection of coincidence between the inverted start pulse at the output of inverter 68 and the pulses of timing generator 9 prior to sampling by the corresponding output of generator 7. When no time coincidence between the start pulse and the output of timing generator 9 occurs, the output of flip flop 72 is high. A sample of the output of bistable device 61 will be passed to the output of "AND" gate 70 in time coincidence with pulse inputs from timing generator 7. This is illustrated in the first cycle of curve T, FIG. 7, wherein the readout pulses sample curve N, FIG. 7 to produce the sample of the output of bistable device which is representative of the condition of the Teletype signal. At the occurrence of pulse 73, curve R, FIG. 7, there is a time coincidence between this pulse and the start pulse 74, curve C, FIG. 7. The time coincidence of these two pulses causes a high output from "AND" gate 69 triggering flip flop 72 to its other steady state which blocks "AND" gate 70 and readies "AND" gate 71 for passage of samples of the output of device 67 upon occurrences of pulses from the timing generator 7. The resultant output is illustrated in the second cycle, curve T, FIG. 7. The output from gates 70 and 71 is coupled to "OR" gate 75 and hence to a modified PTM channel modulator, such as modulator 6, FIG. 1.

At the end of a Teletype character, when flip flop 72 has been flipped to switch the output from bistable device 61 to bistable device 67, flip flop 72 is reset to place the output of device 61 at the output of "OR" gate 75 by means of the reset pulse derived from the output of differentiator-clipper 58 to cause flip flop 72 to assume its normal condition representative of no time coincidence between start pulse and the timing pulses of generator 9.

By shifting the sampling from bistable device 61 to bistable device 67, the stop pulse will be lengthened and likewise if the sampling is shifted in the opposite direction the stop pulse will be shortened. The shortened stop pulse will be corrected at the receiving end of the system by having the Teletype readout rate set approximately 10 percent faster than the read-in rate.

As mentioned hereinabove with respect to FIG. 1, the modulators 6 thereof may be a modified form of PTM modulators in which the presence of a pulse maintains the pulse in its usual position and the absence of a pulse blanks this channel pulse or an alternative method would be to maintain the channel pulse in its usual time position upon the absence of a pulse applied from Teletype terminal 5 and to swing the channel pulse to another time position upon the occurrence of a pulse output from Teletype terminal 5. Regardless of which method is used in modulator 6, the resultant multiplex Teletype signal having correspondingly timed elements of each channel disposed in time adjacent relationship are multiplexed with the output of the other PTM modulators and propagated to the receiving station.

Figure 9:
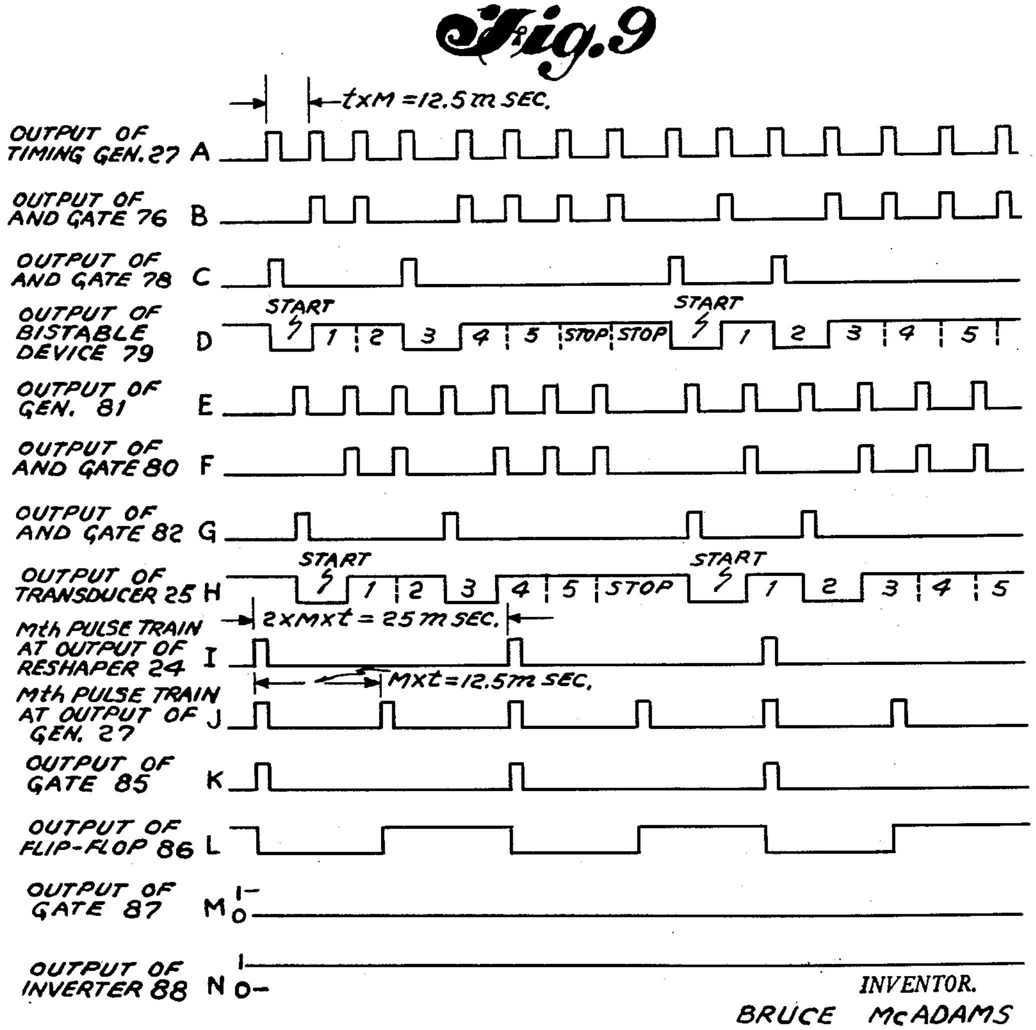
FIG. 9 is a series of curves illustrating the operation of the circuit of FIG. 8.
Figure 8:
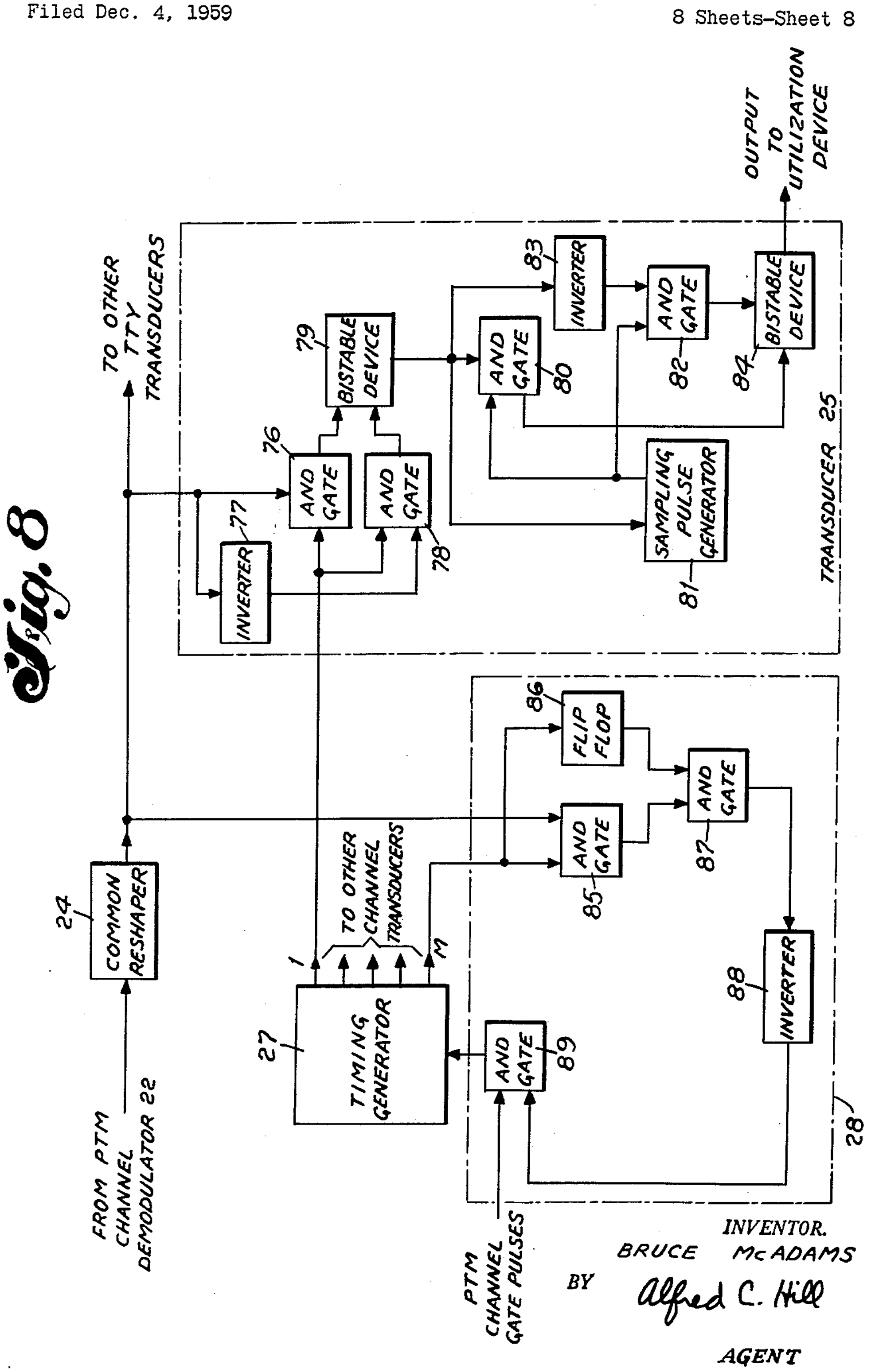
FIG. 8 is a schematic diagram in block form of the synchronizing circuit and the transducer employed in the receiving station of FIG. 2.

Referring to FIGS. 8 and 9, the transducers 25 employed in the receiving station will be described in greater detail. Curves I to N, FIG. 9 are not to the same scale as curves A to H, FIG. 9. As pointed out hereinabove, the multiplexed Teletype signals of a particular PTM channel are separated from the received multiplexed pulse train by PTM demodulator 22 in the case of PTM channel one. The separated multiplexed Teletype pulse train is coupled from demodulator 22 to a common reshaper 24. The output of common reshaper 24 is then coupled to each of the transducers 25 and to synchronizing circuit 28.

Each of transducers 25 has the configuration as illustrated in FIG. 8. The output of shaper 24 to each channel is split into two paths. One of the paths is coupled directly to "AND" gate 76. The other path includes an inverter 77 whose output is coupled to "AND" gate 78. "AND" gates 76 and 78 have coupled thereto the appropriate pulse train from timing generator 27 to thereby activate "AND" gates 76 and 78 to separate the appropriate Teletype signal from the multiplex Teletype signal for application to the Teletype utilization device of that particular channel.

The output pulse train of timing generator 27 is illustrated in curve A, FIG. 9 and has the same repetition rate as the output of timing generator 7 in the transmitting station. This timing relationship is maintained by utilizing the PTM channel gate pulse to trigger the timing generator 27 which preferably takes the form described in connection with FIG. 4 to establish the desired 100 channel gate pulse trains. A vernier adjustment is obtained for the pulse train trigger timing generator 27 by the synchronizing circuit 28 which will be described hereinbelow. The output of "AND" gate 76 will be as illustrated in curve B, FIG. 9 which is identical to curve T, FIG. 7. The output of "AND" gate 78 which gates the inverted version of curve B, FIG. 9, provides the pulse train illustrated in curve C, FIG. 9. The output of these two "AND" gate circuits 76 and 78 are coupled to bistable device 79 which is similar to bistable device 61 of FIG. 6 in its operation, namely, bistable device 79 is triggered nonsymmetrically on both the input device and the output device to enable the regeneration of the Teletype signal in much the same manner as described in connection with bistable device 61. The resultant output of bistable device 79 is illustrated in curve D, FIG. 9. It will be observed that the output of device 79 is substantially the Teletype signal of either curve N or Q, FIG. 7, except that there is a lengthened stop pulse in the first code character which may be caused by the difference between the spacing of the sampling pulses and the length of the code elements which provide a slipping type relationship so that the sample is not taken exactly in the same point on the code element each time this code element is sampled or the adjacent code element is sampled. This also may be caused by switching from bistable device 61 to bistable device 67 to prevent readout at the transition of the Teletype signal, thereby increasing the length of the stop signal as mentioned hereinabove with respect to transducers 10.

The output of bistable device 79 is coupled to "AND" gate 80 and to sampling pulse generator 81. Generator 81 produces sampling pulses in substantially the same manner as the sampling pulses are produced in transducers 10, FIG. 6. That is, sampling pulse generator 81 may include components similar to "AND" gate 46, differentiator-clipper 47, oscillator 48, shaper 49, binary counter including flip flops 50, 51 and 52, inverter 53 and "AND" gate 55 of FIG. 6. The resultant sampling pulses are illustrated in curve E, FIG. 9 and are applied to "AND" gate 80 and "AND" gate 82. "AND" gate 82 also has coupled thereto an inverted version of the output of bistable device 79 through means of inverter 83. The output of "AND" gate 80 and the output of "AND" gate 82 produced by gating the output of generator 81 against the output of device 79 operate upon bistable device 84 to regenerate the Teletype signal substantially as illustrated in curve H, FIG. 9. This second regeneration in bistable device 84 provides a stop pulse having a length longer than normal. The resultant output of device 84 can be used to operate a relay to control the current on the outgoing Teletype line for passage to a Teletype receiver or other utilization device.

The Mth channel at the output of timing generator 27, or in the example employed herein, the 100th channel is used as the framing channel to obtain proper phasing between timing generator 7 and timing generator 27. As pointed out hereinabove, the 100th pulse train output of timing generator 7 was modulated with a 40 cycle per second square wave—in other words, every other pulse of this pulse train was blanked or removed as illustrated in curve I, FIG. 9 to provide a half Teletype frame rate pulse train. This pulse train is separated from the Teletype multiplex signal by the 100th output of timing generator 27, illustrated in curve J, FIG. 9 and in "AND" gate 85. The output of "AND" gate 85 is illustrated in curve K, FIG. 9. The 100th output of generator 27 also triggers flip flop 86 to provide a 40 cycle per second square wave as illustrated in curve L, FIG. 9. The output of "AND" gate 85, the half Teletype frame rate pulse train, and the 40 cycle per second square wave output of flip flop 86 are gated with each other in "AND" gate 87. As long as the output of flip flop 86 is 180 degrees out of phase with the output of "AND" gate 85 there will be no output from the "AND" gate 87, as illustrated in curve M, FIG. 9, and inverter 88 will provide a D.C. potential as illustrated in curve 88, FIG. 9, which will enable "AND" gate 89 and permit the PTM channel gate pulse train to trigger timing generator 27. However, if when starting up the equipment, or for any other reason, any channel other than the 100th channel is read out, the outputs of flip flop 86 and gate 85 will be in phase, and "AND" gate 87 will produce a positive going pulse output equal in width to the width of the pulse output of gate 85. The result will be that the 8 kilocycles of the PTM channel gate pulse will be inhibited by the low output of inverter 88 at "AND" gate 89. This inhibiting of the PTM channel gate pulses will cause timing generator 27 to drop back in its counting one pulse at a time and hence drop back a channel of output signal at a time until channel 100 is gated out. When this occurs the output of "AND" gate 85 and flip flop 86 will again be 180 degrees out of phase.

The system hereinabove described provides substantially distortionless transmission of a large number of Teletype channels, in the order of 100 Teletype channels, over a single channel of any conventional pulse communication multiplex system operating on a time multiplex basis. The only distortion which is introduced into the Teletype signal by the equipment of this arrangement is that occasionally the stop pulse might be shortened a small amount due to shifting from the bistable device 67 to bistable device 61. This distortion may be avoided by slightly increasing the sampling rate of the sampling pulse generator 81. It is felt that this slight amount of distortion which can be readily corrected does not overshadow the advantages achieved in the multiplex communication system of this invention wherein the equipment is simplified. The simplification is accomplished since it is required to store only one code element at any one given time for each channel and reading out this stored code element sequentially from each channel to thereby place correspondingly timed code elements of each channel in time adjacent relationship. This is in contrast to the relatively large amount of equipment necessary in prior art arrangements to store a complete code character prior to reading out from each Teletype channel. Another advantage of this system is the ability of the system without modification to handle mixed Teletype signal speeds ranging from 60 words per minute to 100 words per minute. The prior art arrangements where a complete Teletype character was stored had to be modified to handle mixed Teletype speeds.

While I have described above the principles of my invention in connection with specific apparatus, is to be clearly understood that this description is made only by way of example and not as a limitation to the scope of my invention as set forth in the objects thereof and in the accompanying claims.

I claim:

1. In a communication system, a transmitting station comprising means for generating a first plurality of trains of pulses having a given repetition frequency time spaced with respect to each other, means to modulate certain ones of said first trains of pulses in accordance with different ones of a first plurality of signal waves, means responsive to others of said first trains of pulses to produce a second plurality of trains of pulses having repetition frequencies different than said given repetition frequency time spaced with respect to each other, means to modulate each of said second trains of pulses in accordance with different ones of a second plurality of signal waves, means to modulate said others of said first trains of pulses in accordance with said modulated second trains of pulses, and means to propagate said modulated first trains of pulses to a distant receiving station.

2. In a communication system, a transmitting station comprising means for generating a primary plurality of trains of pulses having a given repetition frequency, time spaced with respect to each other, means to modulate certain ones of said primary trains of pulses in accordance with different signal waves, means responsive to each of the others of said primary trains of pulses to produce an auxiliary plurality of trains of pulses having a repetition frequency different than said given repetition frequency time spaced with respect to each other, means to modulate each of the trains of pulses of each of said auxiliary trains of pulses in accordance with different code signals, means to modulate each of said others of said primary trains of pulses in accordances with its associated auxiliary trains of pulses, and means to propagate said modulated primary trains of pulses to a distant receiving station.

3. In a communication system, a transmitting station comprising means for generating a first plurality of trains of pulses having a first repetition frequency, time spaced with respect to each other, means responsive to one of said first trains of pulses to produce a second plurality of trains of pulses having a second repetition frequency, time spaced with respect to each other, means to modulate each of the others of said first trains of pulses in accordance with different signal waves, means to modulate each of said second trains of pulses in accordance with different code signals, means to modulate said one of said first trains of pulses in accordance with said modulated second trains of pulses, and means to propagate said modulated first trains of pulses to a distant receiving station.

4. In a communication system, a transmitting station comprising means for generating a first plurality of trains of pulses having a given repetition frequency time spaced with respect to each other, means to time modulate certain ones of said first trains of pulses in accordance with different signal waves, means responsive to others of said first trains of pulses to produce a second plurality of trains of pulses having repetition frequencies different than said given repetition frequency, time spaced with respect to each other, means to modulate each of said second trains of pulses in accordance with successive samples of different code signals, means to time modulate said others of said first trains of pulses in accordance with said modulated second trains of pulses, and means to propagate said modulated first trains of pulses to a distant receiving station.

5. In a communication system, a transmitting station comprising means for generating a first plurality of trains of pulses having a first repetition frequency time spaced with respect to each other, means responsive to one of said first trains of pulses to produce a second plurality of trains of pulses having a second repetition frequency, time spaced with respect to each other, means to time modulate each of the others of said first trains of pulses in accordance with different signal waves, means to modulate each of said second trains of pulses in accordance with successive samples of different code signals, means to time modulate said one of said first trains of pulses in accordance with said modulated second trains of pulses, and means to propagate said modulated first trains of pulses to a distant receiving station.

6. In a communication system, a transmitting station comprising means for generating a first plurality of trains of pulses having a first repetition frequency, time spaced with respect to each other, means responsive to at least one of said first trains of pulses to produce a second plurality of trains of pulses having a second repetition frequency equal to said first repetition frequency divided by the number of said second trains of pulses, time spaced with respect to each other, means to time modulate each of the others of said first trains of pulses in accordance with different signal waves, means to modulate each of said second trains of pulses in accordance with successive samples of different teletype signals, means to time modulate the train of pulses of said first trains of pulses producing said second trains of pulses in accordance with said modulated second trains of pulses, and means to propagate said modulated first trains of pulses to a distant receiving station.

7. In a communication system, a transmitting station comprising means for generating a first plurality of trains of pulses having a first repetition frequency, time spaced with respect to each other, means responsive to at least one of said first trains of pulses to produce a second plurality of trains of pulses having a second repetition frequency equal to said first repetition frequency divided by the number of said second trains of pulses, time spaced with respect to each other, means to time modulate others of said first trains of pulses in accordance with different signal waves, means to modulate one of said second trains of pulses to provide a synchronizing signal, means to modulate each of the others of said second trains of pulses in accordance with successive samples of different teletype signals, means to time modulate the train of pulses of said first trains of pulses producing said second trains of pulses in accordance with said modulated second trains of pulses, and means to propagate said modulated first trains of pulses to a distant receiving station.

8. In a communication system, a receiving station comprising means to receive a signal including a plurality of trains of pulses having a given repetition frequency time spaced with respect to each other and a synchronizing signal, each of certain ones of said trains of pulses being modulated in accordance with a different intelligence signal and others of said trains of pulses being modulated in accordance with a plurality of different intelligence signals, means responsive to said synchronizing signal to produce a first plurality of timing signals having a repetition frequency equal to said given repetition frequency time spaced with respect to each other, means responsive to said received signal and certain ones of said first timing signals to recover the intelligence signals of said certain ones of said trains of pulses, means responsive to others of said first timing signals and said received signal to separate said others of said trains of pulses from said received signal, means responsive to said others of said first timing signals to produce a second plurality of timing signals having a repetition frequency different than said given repetition frequency time spaced with respect to each other, and means responsive to said second plurality of timing signals and said others of said trains of pulses to recover the intelligence signals of said others of said trains of pulses.

9. In a communication system, a receiving station comprising means to receive a signal including a plurality of trains of pulses having a given repetition frequency time spaced with respect to each other and a synchronizing signal, each of certain ones of said trains of pulses being modulated in accordance with a different intelligence signal and each of others of said trains of pulses being modulated in accordance with a plurality of different code signals, means responsive to said synchronizing signal to produce a first plurality of timing signals having a repetition frequency equal to said given repetition frequency time spaced with respect to each other, means responsive to said received signal and certain ones of said first timing signals to recover the intelligence signals of said certain ones of said trains of pulses, means responsive to each of the others of said first timing signals and said received signal to separate each of said others of said trains of pulses from said received signal, means responsive to each of said others of said first timing signals to produce a second plurality of timing signals having a repetition frequency different than said given repetition frequency time spaced with respect to each other, and means responsive to each of said second plurality of timing signals and each of said others of said trains of pulses to recover the intelligence represented by the code signals of each of said others of said trains of pulses.

10. In a communication system, a receiving station comprising means to receive a signal including a plurality of trains of pulses having a given repetition frequency time spaced with respect to each other and a synchronizing signal, one of said trains of pulses being modulated in accordance with a plurality of code signals and each of the others of said trains of pulses being modulated in accordance with a different intelligence signal, means responsive to said synchronizing signal to produce a first plurality of timing signals having a repetition frequency equal to said given repetition frequency time spaced with respect to each other, means responsive to said received signal and one of said first timing signals to separate said one of said trains of pulses from said received signals, means responsive to each of said others of said first timing signals and said received signal to recover the intelligence signal of each of said others of said trains of pulses, means responsive to said one of said first timing signals to produce a second plurality of timing signals having a repetition frequency different than said given repetition frequency time spaced with respect to each other, and means responsive to each of said second plurality of timing signals and said one of said trains of pulses to recover the intelligence represented by the code signals of said one of said trains of pulses.

11. In a communication system, a receiving station comprising means to receive a signal including a plurality of trains of pulses having a given repetition frequency time spaced with respect to each other and a synchronizing signal, at least one of said trains of pulses being time modulated in accordance with a plurality of code signals and each of the others of said trains of pulses being time modulated in accordance with a different intelligence signal, means responsive to said synchronizing signal to produce a first plurality of timing signals having a repetition frequency equal to said given repetition frequency time spaced with respect to each other, means responsive to said received signal and at least one of said first timing signals to separate said one of said trains of pulses from said received signal, means responsive to each of said others of said first timing signals and said received signal to recover the intelligence signal of each of said others of said trains of pulses, means responsive to said one of said first timing signals to produce a second plurality of timing signals having a repetition frequency equal to said given repetition frequency divided by the number of said code signals time spaced with respect to each other, and means responsive to each of said second plurality of timing signals and said one of said trains of pulses to recover the intelligence represented by the code signals of said one of said trains of pulses.

12. In a communication system, a receiving station comprising means to receive a time division multiplex signal including a first plurality of trains of pulses having a given repetition frequency time spaced with respect to each other, a second plurality of trains of pulses having a repetition frequency different than said given repetition frequency time spaced with respect to each other and a synchronizing signal, each of said first trains of pulses being modulated in accordance with a different one of a first plurality of intelligence signals and each of said second trains of pulses being modulated in accordance with a different one of a second plurality of intelligence signals, means responsive to said synchronizing signal to produce a first plurality of timing signals having a repetition frequency equal to said given repetition frequency time spaced with respect to each other, a first plurality of demodulators, means to couple said multiplex signal to each of said first demodulators, means to couple certain ones of said first plurality of timing signals to certain ones of said first demodulators to recover said first plurality of intelligence signals, means coupled to the output of each of said first demodulators to utilize said first plurality of intelligence signals, means responsive to said multiplex signal and others of said first plurality of timing signals to separate said second plurality of trains of pulses from said multiplex signal, means responsive to said others of said first plurality of timing signals to produce a second plurality of timing signals having a repetition frequency equal to said different repetition frequency, a second plurality of demodulators, means coupling said second plurality of timing signals to respective ones of said plurality of demodulators, means coupling said separated second plurality of trains of pulses to each of said second demodulators to recover said second plurality of intelligence signals and means coupled to the output of each of said second plurality of demodulators to utilize said second plurality of intelligence signals.

13. In a communication system, a receiving station comprising means to receive a time division multiplex signal including a first plurality of trains of pulses having a given repetition frequency time spaced with respect to each other, a second plurality of trains of pulses having a repetition frequency different than said given repetition frequency time spaced with respect to each other and a first synchronizing signal, each of said first trains of pulses being modulated in accordance with a different intelligence signal, one of said second trains of pulses being modulated in accordance with a second synchronizing signal, the other of said second trains of pulses being modulated in accordance with a different code signal, means responsive to said first synchronizing signal to produce a first plurality of timing signals having a repetition frequency equal to said given repetition frequency time spaced with respect to each other, a first plurality of demodulators, means to couple said multiplex signal to each of said first demodulators, means to couple certain ones of said first plurality of timing signals to certain ones of said first demodulators to recover said first plurality of intelligence signals, means coupled to the output of each of said first demodulators to utilize said first plurality of intelligence signals, means responsive to said multiplex signal and others of said first plurality of timing signals to separate said second plurality of trains of pulses from said multiplex signal, means responsive to said others of said first plurality of timing signals to produce a second plurality of timing signals having a repetition frequency equal to said different repetition frequency, a second plurality of demodulators, means responsive to one of said second plurality of timing signals and said second synchronizing signal of said one of said separated second trains of pulses to synchronize the production of said second plurality of timing signals, means coupling said others of said separated second plurality of trains of pulses to each of said second demodulators, means coupling the others of said second plurality of timing signals to respective ones of said second demodulators to recover said second plurality of intelligence signals and means coupled to the output of said second plurality of demodulators to utilize said second plurality of intelligence signals.

14. A communication system comprising means for generating a first plurality of trains of pulses having a given repetition frequency time spaced with respect to each other, means to modulate certain ones of said first trains of pulses in accordance with different ones of a first plurality of signal waves, means responsive to others of said first trains of pulses to produce a second plurality of trains of pulses having different repetition frequencies than said given repetition frequency time spaced with respect to each other, means to modulate each of said second trains of pulses in accordance with different ones of a second plurality of signal waves, means to modulate said others of said first trains of pulses in accordance with said modulated second trains of pulses, a source of synchronizing signal, means coupled to said source of synchronizing signal and said first and last mentioned means to modulate to propagate said modulated first trains of pulses and said synchronizing signal, means coupled to said propagation means to receive said modulated first trains of pulses and said synchronizing signal, means responsive to said synchronizing signal to produce a first plurality of timing signals having a repetition frequency equal to said given repetition frequency time spaced with respect to each other, means responsive to said modulated first trains of pulses and certain ones of said first timing signals to recover the signal waves of said certain ones of said first trains of pulses, means responsive to others of said first timing signals and said others of said first trains of pulses to recover said modulated second trains of pulses, means responsive to said others of said first timing signals to produce a second plurality of timing signals having a repetition frequency equal to said different repetition frequencies time spaced with respect to each other, and means responsive to said second plurality of timing signals and said modulated second trains of pulses to recover the signal waves of said modulated second trains of pulses.

15. A communication system comprising means for generating a first plurality of trains of pulses having a given repetition frequency time spaced with respect to each other, means responsive to one of said first trains of pulses to produce a second plurality of trains of pulses having different repetition frequencies than said given repetition frequency time spaced with respect to each other, means to modulate others of said first trains of pulses in accordance with different ones of a first plurality of signal waves, means to modulate each of said second trains of pulses in accordance with different ones of a second plurality of signal waves, means to modulate said one of said first trains of pulses in accordance with said modulated second trains of pulses, a source of synchronizing signal, means coupled to said source of synchronizing signal and said first and last mentioned means to modulate to propagate said modulated first trains of pulses and said synchronizing signal, means to receive said modulated first trains of pulses and said synchronizing signal, means responsive to said synchronizing signal to produce a first plurality of timing signals having a repetition frequency equal to said given repetition frequency time spaced with respect to each other, means responsive to one of said first timing signals and said modulated first trains of pulses to recover said modulated second trains of pulses, means responsive to said modulated first trains of pulses and others of said first timing signals to recover the signal waves of said others of said first trains of pulses, means responsive to said one of said first timing signals to produce a second plurality of timing signals having a repetition frequency equal to said different repetition frequencies time spaced with respect to each other, and means responsive to said second plurality of timing signals and said modulated second trains of pulses to recover the signal waves of said modulated second trains of pulses.

16. A code signal multiplex system comprising a plurality of signal channels, a synchronizing signal source, an output means coupled in common to each of said signal channels and said synchronizing signal source, each of said signal channels including a source of code signals having a plurality of code elements and means responsive to said code signals to sequentially store each of said code elements at a first repetition frequency, means coupled to said storage means of each of said channels to sequentially couple correspondingly timed code elements of the code signals of each of said channels to said output means at a second repetition frequency to provide a resultant signal including said correspondingly timed code elements in a time adjacent relationship and said synchronizing signal, means coupled to said output means to propagate said resultant signal over a propagation medium, means coupled to said propagation medium to receive said propagated resultant signal, means coupled to said receiver means responsive to said synchronizing signal to produce a plurality of timing signals having a repetition frequency equal to said second repetition frequency time spaced with respect to each other and a plurality of receiving channels coupled to said receiver means, each of said receiving channels including a storage device, means responsive to the appropriately timed one of said timing signals to couple the code elements associated with the particular receiving channel sequentially to said storage device, and means coupled to the output of said storage device to sequentially couple said stored code elements to a utilization device at a repetition frequency equal to said first repetition frequency.

17. A code signal multiplexer comprising a plurality of signal channels, an output means coupled in common to each of said signal channels, each of said signal channels including a source of code signals having a plurality of code elements and means responsive to said code signals to sequentially store each of said code elements at a first repetition frequency, means coupled to said storage means of each of said channels to sequentially couple correspondingly timed code elements of the code signals of each of said channels to said output means at a second repetition frequency to provide a resultant signal having said correspondingly timed code elements in a time adjacent relationship.

18. A code signal demultiplexer comprising a source of signals including a synchronizing signal and a plurality of code signals having a plurality of code elements, the correspondingly timed code elements of each of said code signals being in time adjacent relationship, means coupled to said source responsive to said synchronizing signal to produce a plurality of timing signals having a first repetition frequency time spaced with respect to each other and a plurality of signal channels coupled to said source, each of said channels including a storage device, means responsive to the appropriately timed one of said timing signals to couple the code elements associated with the particular signal channel sequentially to said storage device, and means coupled to the output of said storage device to sequentially couple said stored code elements to a utilization device at a second repetition frequency.

19. A code signal transducer comprising a source of code signals having a plurality of code elements, first means coupled to said source to sequentially store said code elements, second means coupled to said first means to sequentially store said code elements in a time delayed relationship to said code elements stored in said first means, a signal output means, and means coupled to said first means, said second means and said output means to selectively couple said stored elements from either of said first or second means to said output means.

20. A code signal transducer comprising a source of code signals having a plurality of code elements, first means coupled to said source to sequentially store said code elements, second means coupled to said first means to sequentially store said code elements in a time delayed relationship to said code elements stored in said first means, a signal output means, control means coupled to said first means, said second means, and said output means, and means responsive to the timing of said code signal to control means to selectively couple said stored code elements from either of said first or second means to said output means.

References Cited in the file of this patent

UNITED STATES PATENTS 2,677,725 Schuler ................ May 4, 1954